United States Patent [19]

McCloskey

[11] 4,335,924
[45] Jun. 22, 1982

[54] WEAR RESISTANT BEARING

[75] Inventor: Albert R. McCloskey, Fairfield, Conn.

[73] Assignee: Incom International Inc., Pittsburgh, Pa.

[21] Appl. No.: 208,456

[22] Filed: Nov. 19, 1980

[51] Int. Cl.³ .............................................. F16C 23/04
[52] U.S. Cl. .......................................... 308/72; 204/51; 308/237 R; 308/241; 308/DIG. 8
[58] Field of Search ..................... 308/72, 241, 237 R, 308/DIG. 8, 237 A, 61; 204/51

[56] References Cited

U.S. PATENT DOCUMENTS

| | | | |
|---|---|---|---|
| 2,380,150 | 7/1945 | Collito | 308/72 |
| 2,478,660 | 8/1949 | Keahey | 308/72 |
| 4,095,014 | 6/1978 | Iosso | 204/51 |
| 4,156,634 | 5/1979 | Iosso | 204/51 |

Primary Examiner—Lenard A. Footland
Attorney, Agent, or Firm—James C. Wray

[57] ABSTRACT

A bearing assembly having an inner race member movably mounted in an outer race member, the inner surface of the outer member being a concave spherical surface and the outer surface of the inner member being a complementary convex spherical surface. The outer race member is received within an aperture formed in the head of a shank assembly. The bearing surfaces are formed of zinc-plated metal having a chromium skin layer and a chromium enriched subsurface layer. The chromium skin layer is about 40 microns thick.

13 Claims, 6 Drawing Figures

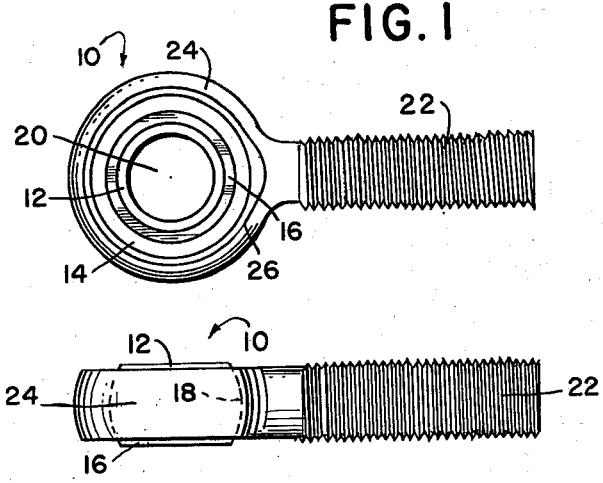
FIG. 1
FIG. 2
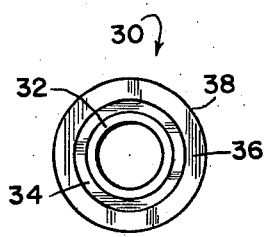
FIG. 3
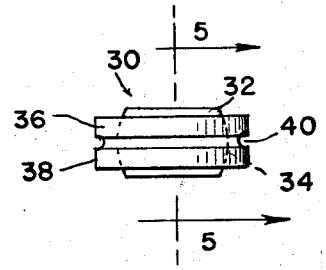
FIG. 4
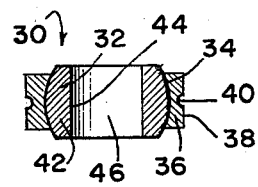
FIG. 5
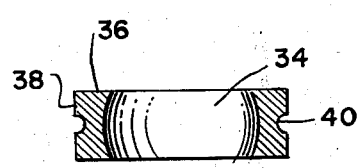
FIG. 6

WEAR RESISTANT BEARING

BACKGROUND OF THE INVENTION

This invention relates generally to bearings and more particularly has reference to a wear resistant bearing having chromium enriched bearing surfaces.

Pertinent United States and foreign patents are found in Class 204, subclasses 51 and 105R, and in Class 308, subclasses 36 and 241 of the official classifications of patents in the U.S. Patent and Trademark Office.

Examples of pertinent patents are U.S. Pat. Nos. 2,380,150; 2,478,660; 4,095,014 and 4,156,634.

U.S. Pat. Nos. 2,380,150 and 2,478,660 disclose bearing assemblies in which the inner surface of an outer race member is a concave spherical surface and the outer surface of an inner race member is a complementary convex spherical surface. That configuration is well known in the bearing art. Those patents further disclose shank assemblies connected to the outer race member. That configuration is also well known in the art. Neither patent specifies the bearing surface material used.

U.S. Pat. No. 4,156,634 discloses a process for electrodeposition of chromium on a solid zinc base metal. The chromium layer is about 40 microns thick. No mention is made of chromium deposition on zinc-plated materials. U.S. Pat. No. 4,095,041 is directed to articles of manufacture produced by the process described in U.S. Pat. No. 4,156,634. Bearings are not mentioned.

Bearings of the type described above are generally made to close tolerances. In use, the bearings are often subjected to extreme conditions which are capable of adversely affecting the integrity of the device. It is therefore essential that they be made from materials which are highly resistant to corrosion and wear. A variety of techniques for achieving the desired resistance have been attempted. However, most have proved unsatisfactory in certain respects.

SUMMARY OF THE INVENTION

The present invention overcomes many of the problems which exist in the prior art devices. The bearing surfaces of the present invention are formed of a zinc-plated metal having a chromium skin layer and a chromium enriched subsurface layer immediately below the chromium skin layer. In the preferred embodiment of the present invention, the chromium skin layer is about 40 microns thick. The maximum thickness of the skin and subsurface layer is about 0.01 inches. Bearings having such chromium enriched bearing surfaces have proved highly resistant to corrosion and wear.

Objects of the invention are, therefore, to provide an improved bearing and to provide a bearing which is highly resistant to corrosion and wear.

Another object of the invention is to provide a chromium enriched, zinc-plated metal bearing surface.

Yet another object of the invention is to provide a bearing assembly with an outer race member having a concave spherical inner surface, said inner surface being formed of a zinc-plated metal base material having a substantially continuous chromium skin layer and a chromium enriched subsurface layer of said zinc-plated metal immediately below said chromium skin layer.

A further object of the invention is to provide an inner race member movably mounted in the outer race member, said inner race member having a convex spherical outer surface conforming generally with the outer surface of the inner race member and being formed of zinc-plated metal.

These and other and further objects and features of the invention are apparent in the disclosure which includes the above and below specification and claims and drawings.

BRIEF DESCRIPTION OF THE DRAWINGS

FIG. 1 is a top plan view of a bearing assembly embodying the features of the present invention.

FIG. 2 is a side elevational view of the bearing assembly shown in FIG. 1.

FIG. 3 is a top plan view of another embodiment of the present invention.

FIG. 4 is a side elevational view of the bearing assembly shown in FIG. 3.

FIG. 5 is a sectional view taken along line 5—5 of FIG. 4.

FIG. 6 is a sectional view of the outer race member shown in FIG. 5.

DETAILED DESCRIPTION OF THE DRAWINGS

Referring to FIGS. 1 and 2, the bearing assembly of the present invention is generally indicated by the numeral 10.

The bearing assembly 10 has an inner race member 12 and an outer race member 14. The bearing surface 16 of the inner race member 12 is a convex spherical surface and the bearing surface 18 of the outer race member 14 is a complementary concave spherical surface. The bearing surfaces 16 and 18 coat to permit relative movement between the inner race member 12 and outer race member 14.

An axial bore 20 formed in the inner race member 12 allows the inner race member 12 to be readily connected to an operating mechanism. The threaded stem 22 allows the outer race member 14 to be connected to a particular type of operating mechanism. As shown in FIG. 1, the head 24 of the threaded stem 22 has an aperture 26 which engagingly receives the outer race member 14.

An alternative embodiment of the present invention is shown in FIGS. 3-6 and is generally indicated by the numeral 30. The inner race member 32 is essentially identical to the inner race member 12 shown in FIGS. 1 and 2. The bearing surface 34 of the outer race member 36 is essentially identical to the bearing surface 18 of the outer race member 14 shown in FIGS. 1 and 2. The outer surface 38 of the outer race member 36 is provided with an annular groove 40 to enable the outer race member 36 to be connected to a particular type of operating mechanism. The configuration of the outer surface 38 can be varied to accomodate any type of operating mechanism.

FIG. 5 best illustrates the structure of the inner race member 32. The outer surface 42 is a convex spherical bearing surface. The inner surface 44 is a cylindrical surface which defines an axial bore 46.

The bearing surface 34 of the outer race member 36 is best shown in FIG. 6.

All the bearing surfaces are formed initially of zinc-plated metal. The metal can be steel, copper, iron, bronze or aluminum, or any other metal useful in making bearings. Processes for zinc plating of metal are well known in the art. They include galvanizing, hot dipping and electroplating. Any of those techniques can be used in the present invention.

At least one bearing surface in a bearing assembly is thereafter subjected to a chromium enrichment process. One such process useful in making the bearing assemblies of the present invention is described in U.S. Pat. No. 4,156,634. Other processes may also be used. The chromium enrichment process per se is not part of the present invention and need not be described in detail here.

During the chromium enrichment process, a substantially continuous hard chromium skin layer is formed on the bearing surface. Formed immediately adjacent and below the skin layer is a chromium enriched subsurface layer of the zinc-plated metal. The subsurface layer may be as thick as the skin layer and usually is even thicker. The thickness of the skin layer can be adjusted to suit operational requirements. However, a thickness of about 40 microns is preferred. The skin and subsurface layer should be no thicker than about 0.01 inches.

The skin layer provides a relatively hard bearing surface which is much more resistant to corrosion and wear than a zinc-plated metal bearing surface. The chromium enriched subsurface layer is also harder than the zinc-plated metal itself and materially contributes to the improved resistance of the bearing assembly.

While the invention has been described with reference to a specific embodiment, the exact nature and scope of the invention is defined in the following claims.

I claim:

1. A bearing assembly comprising
a race member having a spherical surface, said surface being formed of zinc-plated metal base material having a substantially continuous chromium skin layer and a chromium enriched subsurface layer of said zinc-plated metal immediately below said chromium skin layer.

2. The apparatus of claim 1 wherein
the race member is an outer race member and the spherical surface is a concave spherical inner surface, and further comprising
an inner race member movably mounted in the outer race member, said inner race member having a convex spherical outer surface conforming generally with the inner surface of the outer race member, said outer surface being formed of zinc-plated metal.

3. The apparatus of claim 1 wherein
the race member is an inner race member and the spherical surface is a convex spherical outer surface, and further comprising
an outer race member having a convex spherical inner surface conforming generally with the outer surface of the inner race member, said inner surface being formed of zinc-plated metal, and said inner race member being movably mounted in the outer race member.

4. The apparatus of claim 1 further comprising
a shank assembly connected to the race member, said shank assembly comprising a threaded stem portion terminating in a head portion having an aperture configured to engagingly receive the race member.

5. The apparatus of claim 1 wherein
the chromium skin layer has a thickness of about 40 microns.

6. The apparatus of claim 1 wherein
the skin and subsurface layer has a maximum thickness of about 0.01 inches.

7. The apparatus of claim 1 wherein the metal base material is zinc-plated steel.

8. The apparatus of claim 1 wherein the metal base material is zinc-plated copper.

9. The apparatus of claim 1 wherein the metal base material is zinc-plated iron.

10. The apparatus of claim 1 wherein the metal base material is zinc-plated bronze.

11. The apparatus of claim 1 wherein the metal base material is zinc-plated aluminum.

12. A bearing assembly comprising
an outer race member having a concave spherical inner surface, and
an inner race member movably mounted in the outer race member, said inner race member having a convex spherical outer surface conforming generally with the inner surface of the outer race member,
said inner surface and said outer surface being formed of zinc-plated metal base material having a substantially continuous chromium skin layer and a chromium enriched subsurface layer of said zinc-plated metal immediately below said chromium skin layer.

13. The apparatus of claim 1 further comprising
a radially extending shank connected to the race member, said shank having a threaded outer surface.

* * * * *